(12) United States Patent
Yang et al.

(10) Patent No.: US 12,370,671 B2
(45) Date of Patent: Jul. 29, 2025

(54) BEARING-TYPE TWIN-PIVOT CONTINUUM ROBOT

(71) Applicant: XI'AN JIAOTONG UNIVERSITY, Shaanxi (CN)

(72) Inventors: Laihao Yang, Shaanxi (CN); Zheshuai Yang, Shaanxi (CN); Yu Sun, Shaanxi (CN); Xuefeng Chen, Shaanxi (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 0 days.

(21) Appl. No.: 18/232,150

(22) Filed: Aug. 9, 2023

(65) Prior Publication Data

US 2024/0109184 A1 Apr. 4, 2024

(30) Foreign Application Priority Data

Sep. 29, 2022 (CN) .......................... 202211205188.4

(51) Int. Cl.
*B25J 9/06* (2006.01)
*B25J 9/00* (2006.01)
*B25J 9/10* (2006.01)

(52) U.S. Cl.
CPC ............. *B25J 9/065* (2013.01); *B25J 9/0078* (2013.01); *B25J 9/108* (2013.01)

(58) Field of Classification Search
CPC ........... B25J 9/108; B25J 9/065; B25J 9/0078
See application file for complete search history.

(56) References Cited

U.S. PATENT DOCUMENTS

| | | | |
|---|---|---|---|
| 2010/0116081 A1* | 5/2010 | Pistor ..................... | B25J 9/0012 264/334 |
| 2018/0370045 A1* | 12/2018 | Kan ........................ | A61B 34/71 |
| 2022/0410374 A1* | 12/2022 | Thorpe ................ | B25J 11/0085 |

* cited by examiner

*Primary Examiner* — Terence Boes

(57) ABSTRACT

The present disclosure discloses a bearing-type twin-pivot continuum robot, including: an actuating device, used for driving a continuum manipulator through a driving cable such that the continuum manipulator performs a bending motion; a continuum manipulator, connected with the actuating device through the driving cable, the continuum manipulator comprising M sections, adjacent sections being able to be deflected, and the continuum manipulator performing the bending motion under the driving of the actuating device; and a linear slide module, disposed at the bottom of the actuating device, the linear slide module having a predetermined feed slide in a feed direction such that the actuating device performs a feed motion within the predetermined slide. The above continuum robot greatly improves the resistance to torsion of the manipulator by adopting a rigid-compliant coupling mode, and creatively introduces a micro-bearing design that avoids adverse effects due to friction between conventional rigid hinges.

6 Claims, 4 Drawing Sheets

BEARING-TYPE TWIN-PIVOT CONTINUUM ROBOT

CROSS-REFERENCE TO RELATED APPLICATION

This application claims priority from the Chinese patent application 2022112051884 filed Sep. 29, 2022, the content of which are incorporated herein in the entirety by reference.

TECHNICAL FIELD

The present disclosure belongs to the technical field of robots, and particularly relates to a bearing-type twin-pivot continuum robot.

BACKGROUND

An aero-engine is the heart of aircraft, and its safety and reliability are the focus of great interest to the world's aviation industry. The rapid and efficient in-situ inspection and maintenance of critical components of the aero-engine is critical to safeguarding engine safety and reliability. In recent years, the "Robot+Autonomous Intelligence" engine internal structure maintenance model is increasingly adopted by large aviation giants and becomes a competitive ground for industry competition. The development of detection robots adapted to the internal structure of the aero-engine is its core technical connotation, and the structural design of continuum manipulator is also one of the important components of detection robots.

The conventional compliant backbone continuum manipulator of the single-pivot mechanism usually suffers from the twisting and buckling problems, while the compliant backbone continuum manipulator of the twin-pivot mechanism overcomes the twisting problem to some extent, but with the increase of length-to-diameter ratio and load, the torsion problem still exists. Although the rigid backbone continuum manipulator based on a cross universal joint structure greatly increases the rigidity and positioning accuracy of the manipulator, its compliance performance is relatively poor, and its adaptability to the internal confined space of the aero-engine is restricted. Therefore, the above structures have more or less obvious defects.

SUMMARY

Aiming at the deficiencies in the prior art, the objective of the present disclosure is to provide a bearing-type twin-pivot continuum robot. By introducing the design of micro-bearings, the present disclosure can avoid the adverse effects caused by friction between traditional rigid hinges and greatly improve the compliance performance of the manipulator.

In order to achieve the above objective, the present disclosure provides the following technical solutions:
a bearing-type twin-pivot continuum robot, including:
  an actuating device, used for driving a continuum manipulator through a driving cable such that the continuum manipulator performs a bending motion;
  a continuum manipulator, connected with the actuating device through the driving cable, the continuum manipulator including M sections, adjacent sections being able to be deflected, and the continuum manipulator performing the bending motion under the driving of the actuating device; and
  a linear slide module, disposed at the bottom of the actuating device, the linear slide module having a predetermined feed slide in a feed direction such that the actuating device performs a feed motion within the predetermined slide.

Preferably, each section includes N continuum manipulator modules which are sequential connected and structurally identical.

Preferably, each continuum manipulator module includes a metal disc.

Preferably, each of an upper surface and a lower surface of the metal disc is provided with a chamfered groove face.

Preferably, the upper surface of the metal disc is provided with an earring.

Preferably, the lower surface of the metal disc is provided with a shoulder.

Preferably, a side of the metal disc is uniformly provided with grooves.

Preferably, the outside of the earring is symmetrically provided with bosses.

Preferably, the actuating device includes a plurality of driving units arranged in a ring on front and rear fixing plates.

Preferably, the linear slide module includes a driving motor, a ball screw, and a feed slide.

Compared with the prior art, the beneficial effects brought by the present disclosure are:
1. The present disclosure greatly improves the torsion resistance of the manipulator by adopting a rigid-compliant coupling mode.
2. In the present disclosure, two adjacent metal discs are provided with symmetrical chamfered groove faces, which are in contact with each other to allow physical deadlocking, thereby restricting the motion of the manipulator, which can not only protect the compliant rod from excessive yielding deformation, but also allow the manipulator to have greater load capacity.
3. The present disclosure ingeniously introduces the design of the micro-bearings, avoiding the adverse effects due to friction between the traditional rigid hinges, greatly improving the compliance performance of the manipulator while maintaining the miniaturization of the structure.
4. The robot of the present disclosure has a miniaturized structure, a reasonably compact layout, and scalability.

Figure 1:
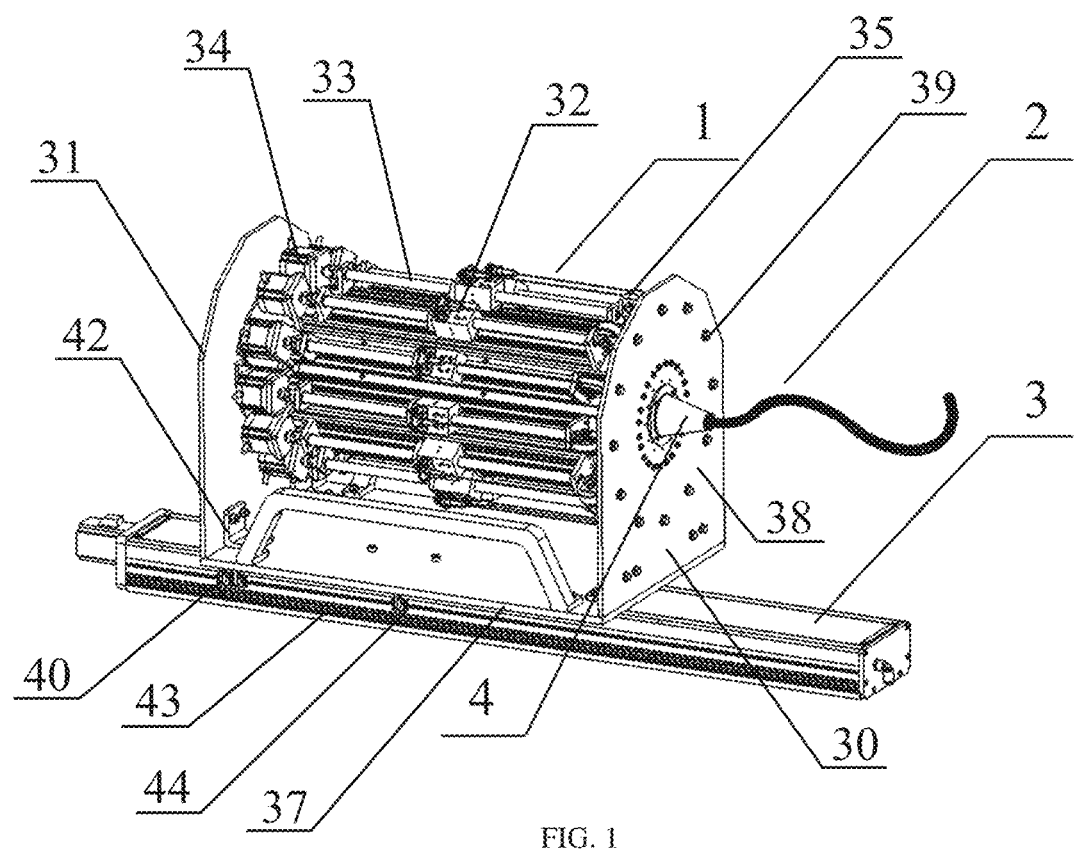
FIG. 1 is a structural schematic diagram of a bearing-type twin-pivot continuum robot according to an embodiment of the present disclosure.

The reference signs in the figures are illustrated as follows:
  1-actuating device; 2-continuum manipulator; 3-linear slide module; 4-hollow conical connector; 5-manipulator base; 6-first segment of continuum manipulator structure; 7-second segment of continuum manipulator structure; 8-compliant rod; 9-micro-bearing; 10-pin; 11-metal disc; 12-set screw; 13-circular arc chamfered groove; 14-cable through hole; 15-earring; 16-blind hole; 17-threaded hole; 18-shoulder; 19-chamfered groove face; 20-groove; 21-weight-reducing chamfered groove; 22-boss; 23-earring-free metal disc; 24-independent earring; 25-earring set screw; 26-earring mounting groove; 27-lateral through hole; 28-tapered through hole; driving cable (29); front plate (30); rear plate (31); support plate (32); horizontal section (33); first section (34); second section (35); support end (36); support section (37); lead screw module (38); lead screw (39); slider (40); lead screw motor (41); L-shaped plate (42); ball screw (43), feed slide (44); upper surface (45) and a lower surface (46).

DETAILED DESCRIPTION OF THE EMBODIMENTS

Specific embodiments of the present disclosure will be described in detail below with reference to the accompanying drawings 1 to 7. While specific embodiments of the present disclosure are illustrated in the drawings, it should be understood that the present disclosure may be embodied in various forms and should not be limited to the embodiments set forth herein. On the contrary, these embodiments are provided in order to understand the disclosure more thoroughly and to convey the scope of the disclosure to those skilled in the art completely.

It should be noted that certain terms are used throughout the specification and claims to refer to certain components. It will be appreciated by those skilled in the art that different terms may be used by those skilled in the art to refer to the same component. The present specification and claims do not use noun differences as a way of distinguishing components, but use functional differences of components as a criterion of distinguishing. As referred to throughout the specification and the claims, "including" or "comprising" is an open-ended term and is therefore construed as "including but not limited to". Subsequent description of the specification is intended to carry out preferred embodiments of the disclosure, although the description is intended for the purpose of general principles of the specification and is not intended to limit the scope of the disclosure. The scope of protection of this disclosure shall be defined in the appended claims.

In order to facilitate the understanding of the embodiments of the present disclosure, the specific embodiments will be further explained in combination with the accompanying drawings, and the accompanying drawings do not constitute a limitation of the embodiments of the present disclosure.

In one embodiment, as shown in FIG. 1, the present disclosure provides a bearing-type twin-pivot continuum robot, including:

An actuating device 1, used for driving a continuum manipulator2 through a driving cable (29) such that the continuum manipulator2 performs a bending motion;

a continuum manipulator 2, connected with a robot body through a hollow conical connector 4 and the actuating device 1 through the driving cable (29), the continuum manipulator 2 at least including 2 segments of continuum manipulator structures, and the continuum manipulator performing the bending motion under the driving of the actuating device; and a linear slide module 3, disposed at the bottom of the actuating device 1, the linear slide module3 having a predetermined feed slide (44) in a feed direction such that the actuating device1 performs a feed motion within the predetermined slide.

The robot described in the above embodiment is assembled from modules of the same structure and has a compact structure and a uniform layout, which can minimize friction, improve driving efficiency and realize the bending motion of the continuous robot.

Figure 2:
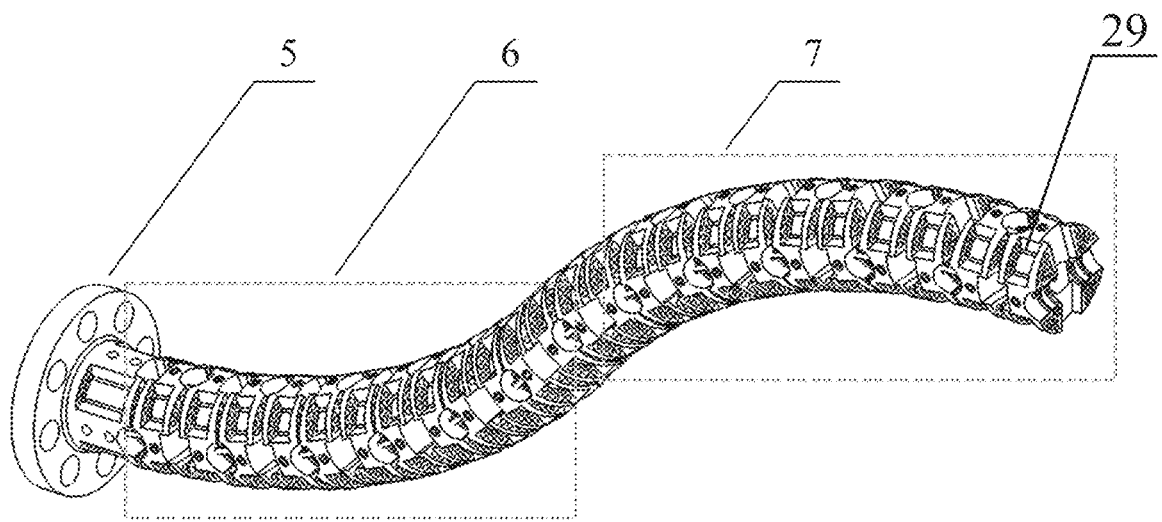
FIG. 2 is a structural schematic diagram of the continuum manipulator of FIG. 1.

In another embodiment, as shown in FIG. 2, for example, the continuum manipulator includes the first segment of continuum manipulator structure 6 and the second segment of the continuum manipulator structure 7, each segment of structure includes M segments, and each segment includes N consecutively connected continuum manipulator modules of the same structure.

Figure 3:
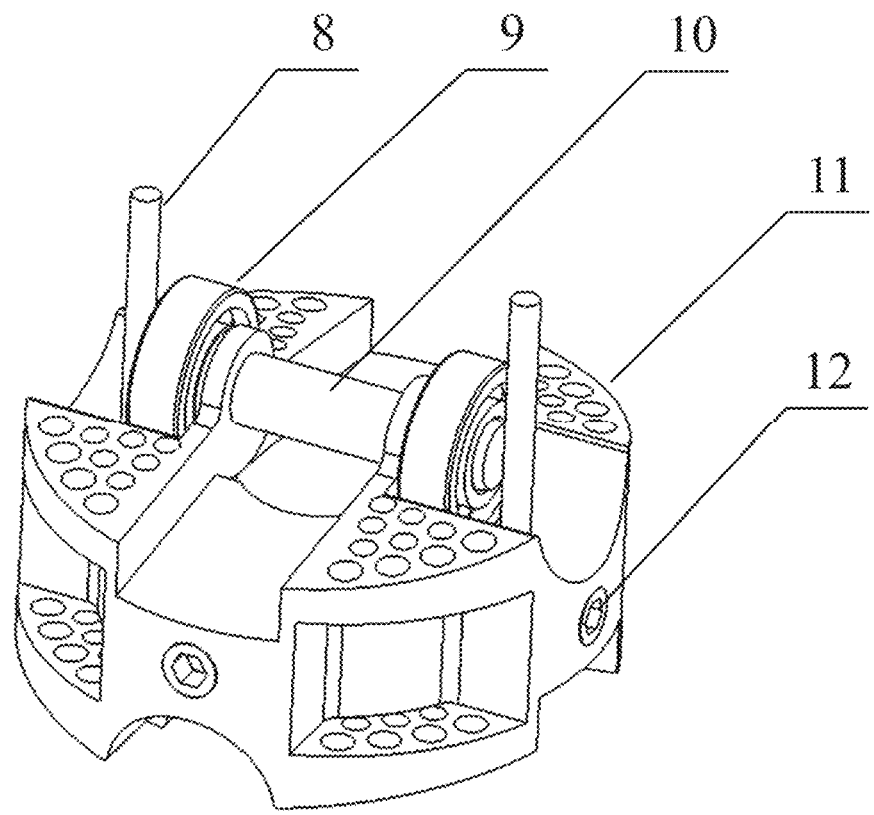
FIG. 3 is a structural schematic diagram of the continuum manipulator module of FIG. 2.

In another embodiment, as shown in FIG. 3, each continuous manipulator module includes a metal disc 11.

In the present embodiment, an upper surface (45) and a lower surface (46) of the metal disc are both symmetrically provided with blind holes 16, the blind holes 16 are inserted with compliant rods 8 to connect two metal discs adjacent to each other, and the blind holes on the upper surface (45) and the blind holes on the lower surface (46) are staggered, and the connecting line between the two symmetrically disposed blind holes on the upper surface (45) is perpendicular to the connecting line between the two symmetrically disposed blind holes on the lower surface (46). Compliant rods of super-elastic Nickel-titanium memory alloy are inserted into the blind holes to fix the two adjacent metal discs, and the four cylindrical side faces of the metal disc corresponding to the blind holes are provided with threaded holes 17 into which the set screws 12 are screwed to fix the compliant rods. Preferably, the threaded hole 17 has the dimensions of M2×2 and the set screw 12 is an Allen butt end set screw of the GB/T 77-2000 type.

It should be noted that, the blind holes are in a staggered layout, two pairs of adjacent compliant rods on the upper surface (45) and the lower surface (46) of the metal disc are staggered to form a staggered twin-pivot structure such that the planes in which the bending directions of the upper and lower adjacent compliant rods lie are staggered with each other. Compared with the structure using a single compliant rod, the twisting of the continuum manipulator in the direction around the central axis can be greatly reduced.

Figure 4:
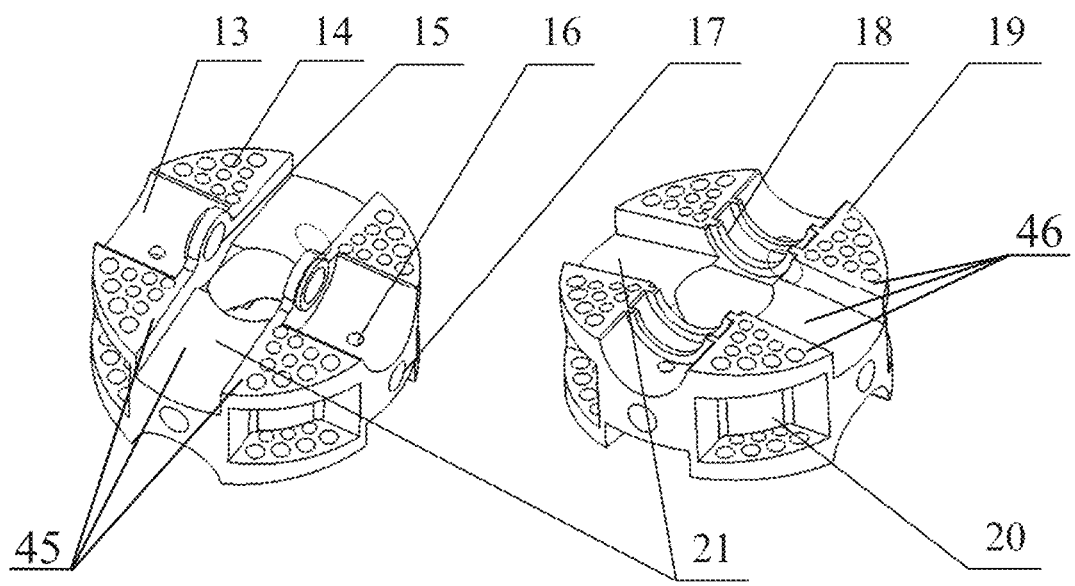
FIG. 4 is a structural schematic diagram of the metal disc of FIG. 3.

In another embodiment, as shown in FIGS. 3 and 4, the upper and lower surfaces (46) of the metal disc are each provided with chamfered groove faces 19 on which the cable through holes 14 are arranged, and a chamfered groove is arranged between adjacent chamfered groove faces.

In this embodiment, as shown in FIG. 4, the upper surface (45) and the lower surface (46) of the metal disc are each provided with four chamfered groove faces, and a chamfered groove is arranged between two adjacent chamfered groove faces on each surface, the chamfered grooves include 2 symmetrically disposed circular arc chamfered grooves 13 and 2 symmetrically disposed weight-reducing chamfered grooves 21, the blind holes are located on the circular arc chamfered grooves. By providing the chamfered grooves, weight reduction can be achieved on the one hand, and machining can be facilitated on the other hand. If the chamfered grooves are not provided but planes are provided, the surface roughness of this part will have an impact on the contact between the two metal discs. When a chamfered face of the chamfered groove has already contacted in advance due to bulges, but chamfered planes of threading holes on both sides have not contacted, there will have an impact on the bending angle of the segment.

Further, the two circular arc chamfered grooves of the upper surface (45) and the two circular arc chamfered grooves of the lower surface (46) of the metal disc are staggered, and the two weight-reducing chamfered grooves of the upper surface (45) and the two weight-reducing chamfered grooves of the lower surface (46) of the metal disc are staggered. By staggering the chamfered grooves, a staggering arrangement between the blind holes on the upper surface (45) and the blind holes on the lower surface (46) of the metal disc can be achieved.

Further, each chamfered groove face is provided with a set of cable through holes 14, the number of the through holes decreasing from outside to inside, the driving cables (29) passing through the cable through holes manipulating the manipulator to perform a bending movement.

It should be noted that the number of through holes decreases from the outside to the inside because the outer ring radius of the metal disc is large and more cable holes can be arranged, but as the inner ring radius decreases, the same number of holes cannot be arranged at the same hole-to-hole spacing, so the number decreases. The minimum distance between the cable holes of the outer ring is about 0.29 mm. If the spacing is smaller, the wall thickness between two holes may be too thin to affect cable perforation.

In another embodiment, as shown in FIG. 4, the upper surface (45) of the metal disc is provided with an earring 15.

In the present embodiment, earrings 15 are symmetrically arranged on the upper surface (45) of the metal disc (denoted as the metal disc A) at the relative positions of the circular arc chamfered grooves, the outer sides of the earrings are symmetrically provided with micro-bearings 9, and the symmetrically provided earrings and micro-bearings are connected by a pin 10 so that the micro-bearings fall into the arc-shaped chamfered grooves (it should be noted that there is a gap between the outer ring of the micro-bearing and the arc-shaped chamfered groove where they do not touch). One more metal disc (denoted as the metal disc B) is arranged on the metal disc A provided with the micro-bearing, so that a section of bendable segment is constructed, at this time, the outer ring of the micro-bearing is in contact with the circular arc chamfered groove of the lower surface (46) of the metal disc B, and when the segment is bent, the outer ring of the micro-bearing is relatively stationary with the circular arc chamfered groove of the upper surface (45) of the metal disc A and with the circular arc chamfered groove of the lower surface (46) of the metal disc B (a rotating shaft is the inner ring of the bearing), thereby reducing the friction between the metal discs of the manipulator.

By providing the micro-bearings, it is possible to avoid adverse effects due to friction between the conventional rigid hinges, minimize friction between the metal discs, and greatly improve compliance of the manipulator while maintaining miniaturization of the overall structure.

In another embodiment, as shown in FIG. 4, the lower surface (46) of the metal disc is symmetrically provided with shoulders 18 for gripping the micro-bearings.

In this embodiment, the shoulders 18 are symmetrically provided on the circular arc chamfered grooves on the lower surface (46) of the metal disc, and the shoulders 18 and the earrings 15 on the upper surface (45) of the metal disc are staggered, so that the micro-bearings 9 can be firmly fixed to the metal disc via the shoulders 18.

In another embodiment, as shown in FIGS. 3-7, the side of the metal disc is uniformly provided with grooves 20.

In this embodiment, as shown in FIG. 4, the mass of the metal disc is reduced and the bending flexibility of the manipulator is improved by providing four grooves 20 uniformly on the cylindrical side of the metal disc.

In another embodiment, bosses 22 are provided symmetrically on the outsides of the earrings.

Figure 5:
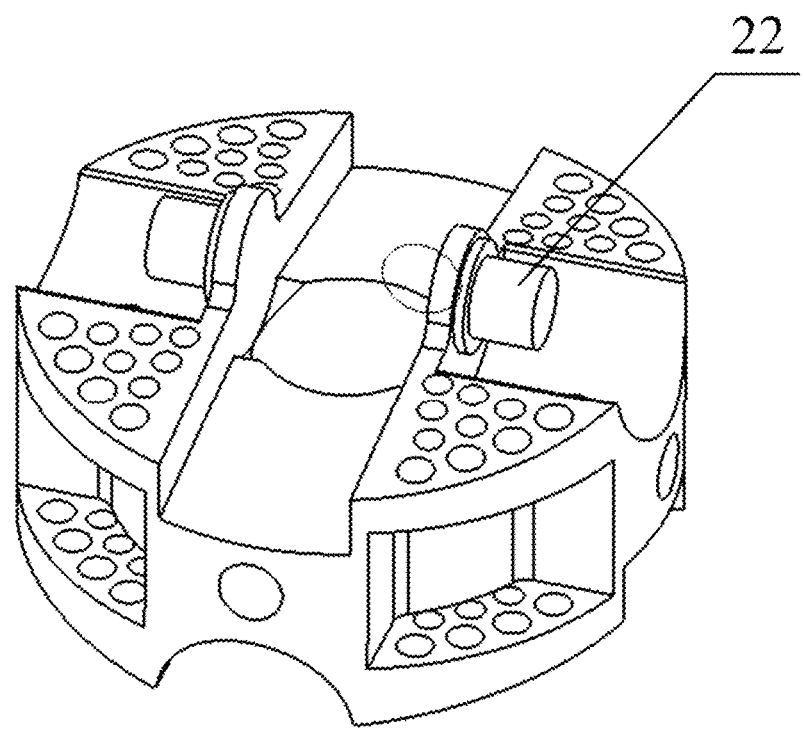
FIG. 5 is a structural schematic diagram of an alternative metal disc of FIG. 3.

In this embodiment, instead of using the pin as described above, the bosses may be symmetrically provided on the earrings to connect the micro-bearings, as shown in FIG. 5. By using the bosses instead of the pin, the mass of the manipulator may be further reduced to some extent and the overall structure of the metal disc may be more integrated.

In another embodiment, the micro-bearing is located on the inside or outside the compliant rod of the earring.

Figure 6:
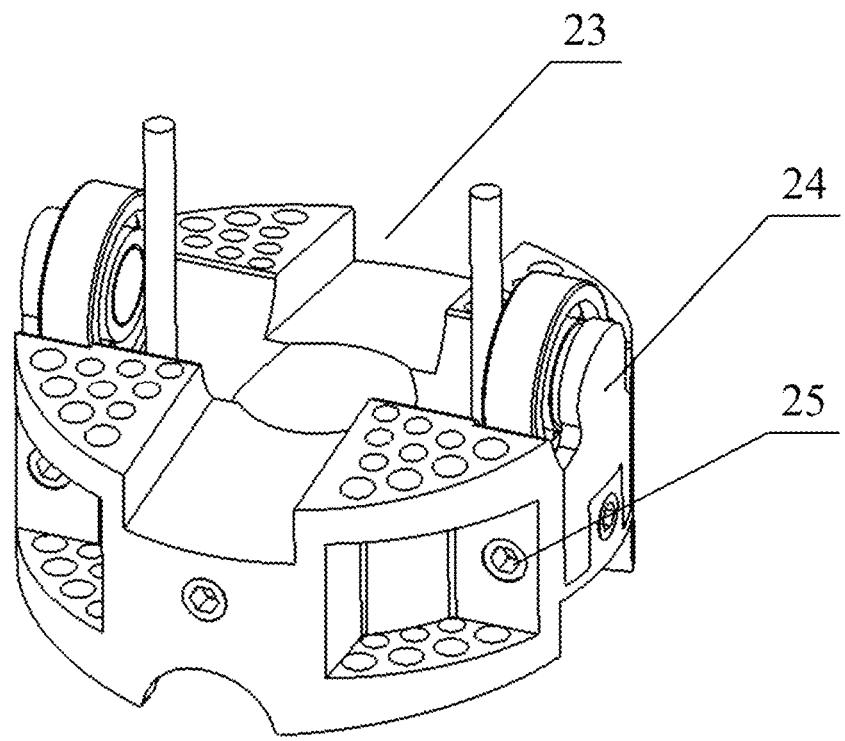
FIG. 6 is a structural schematic diagram of an alternative metal disc of FIG. 3.
Figure 7:
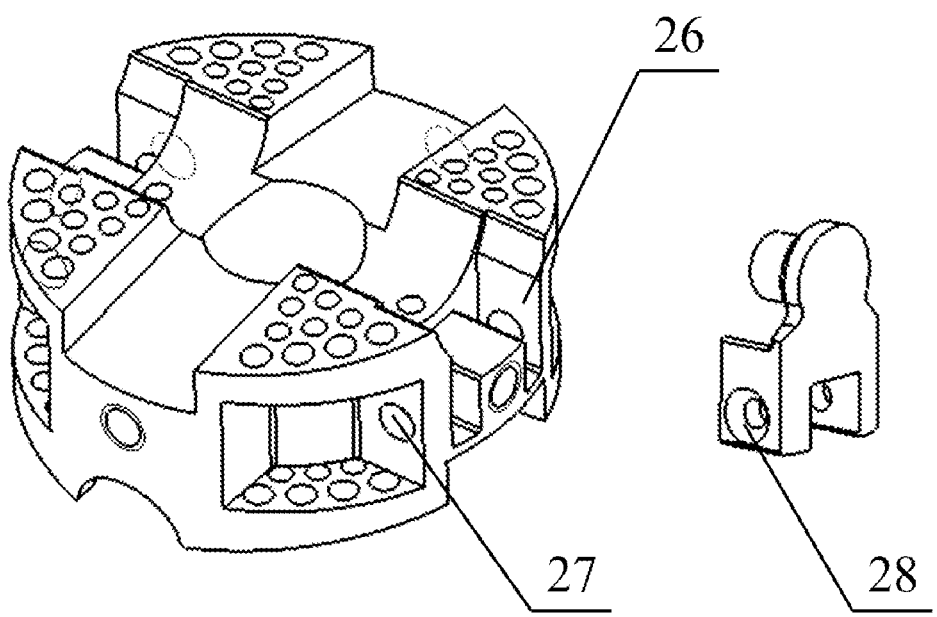
FIG. 7 is a structural schematic diagram of the earring-free metal disc and the independent earring of FIG. 6.

In this embodiment, the micro-bearing is mounted in two ways. First, in the embodiment shown in FIG. 3, the micro-bearing is located on the inside the compliant rod; second, as shown in FIG. 6, the micro-bearing is located on the outside the compliant rod, by placing the micro-bearing on the outside the compliant rod, the mounting of the independent earring 24 and the earring-free metal disc 23 can be facilitated, and in FIG. 7, an earring mounting groove 26 is formed on the circular arc chamfered groove 13 of the earring-free metal disc 23, and a lateral through hole 27 is formed at the groove 20, and tapered through holes 28 are formed on both sides of the independent earring 24, and the independent earring 24 is mounted on the earring-free metal disc 23 by means of earring set screws 25. If the micro-bearing 9 is mounted on the inside of the compliant rod 8, the independent earring 24 in FIG. 7 will not be able to be fastened to the earring-free metal disc 23; at the same time, the external arrangement may also result in greater resistance to torsion. The independent earring 24 and the earring-free metal disc 23 are not integrally formed and are two separate pieces that are secured by set screws. Such a separate design is intended to facilitate machining. If the earring-free metal disc 23 and the independent earring 24 are of one-piece construction, the fixing mode of the earring is omitted, but it is extremely difficult or impossible to machine.

In another embodiment, the actuating device includes a plurality of driving units annularly disposed on the front and rear mounting plates.

In this embodiment, each driving unit includes a support plate (32) having a horizontal section (33) and a first section (34) and a second section (35) extending substantially perpendicular to a support end (36) from both ends of a support section (37), the first section (34) connecting the front plate (30) and the second section (35) connecting the rear plate (31). Each driving unit further includes a lead screw module (38) fixed on the support section (37), the lead screw module (38) including a lead screw (39), a slider (40) slidingly connecting the lead screw (39), and a lead screw motor (41) for driving the lead screw (39). An L-shaped plate (42) is fixed to the slider (40), and a cable lock is fixed to the L-shaped plate (42), and the cable lock is connected to one end of a steel cable, and the other end of the steel cable is connected to the continuum manipulator through uniformly distributed through holes in the front plate (30).

In another embodiment, the linear slide module includes a driving motor, a ball screw (43), and a feed slide (44).

In the present embodiment, the feed slide (44) slides along the ball screw (43) by the driving motor, thereby causing the actuating device to slide to control the feeding movement of the continuum manipulator. Then, through the movement of the actuating device, the expansion and contraction of the steel cable are controlled, and the force is transmitted to the continuum manipulator so as to control the continuum manipulator to bend.

INDUSTRIAL APPLICABILITY

The bearing-type twin-pivot continuum robot module and the robot of the present disclosure can be manufactured and used in the field of robots.

The basic principles of the present application have been described above in connection with specific embodiments, however, it should be noted that the advantages, effects and the like mentioned in the present application are only examples and not limitations, and these advantages, effects and the like are not to be considered as necessarily being present in the various embodiments of the present application. Moreover, the foregoing disclosure of specific details has been presented for purposes of illustration and understanding only, and is not intended to limit to the fact that the application must be implemented with the specific details described above.

The foregoing description has been presented for purposes of illustration and description. Furthermore, this description is not intended to limit embodiments of the present application to the form disclosed herein. While a number of example aspects and embodiments have been discussed above, those of skill in the art will recognize certain variations, modifications, changes, additions and sub-combinations thereof.

What is claimed is:

1. A twin-pivot continuum robot provided with micro-bearing, comprising:
    an actuating device (1), used for driving a continuum manipulator (2) through a driving cable (29) such that the continuum manipulator (2) performs a bending motion; wherein the actuating device (1) comprises a plurality of driving units annularly disposed on front plate (30) and rear plates (31); each driving unit comprises a support plate (32) having a horizontal section (33) and a first section (34) and a second section (35) extending substantially perpendicular to a support end (36) from both ends of a support section (37), the first section (34) connecting the front plate (30) and the second section (35) connecting the rear plate (31);
    and the each driving unit further comprises a lead screw module (38) fixed on the support section (37), the lead screw module (38) comprising a lead screw (39), a slider (40) slidingly connecting the lead screw (39), and a lead screw motor (41) for driving the lead screw (39); an L-shaped plate (42) is fixed to the slider (40);
    the continuum manipulator (2), connected with the actuating device (1) through the driving cable (29), the continuum manipulator (2) comprising a number of segments, adjacent segments being able to be deflected, and the continuum manipulator (2) performing the bending motion under the driving of the actuating device (1); and
    a linear slide module (3), disposed at the bottom of the actuating device (1), the linear slide module (3) having a predetermined feed slide in a feed direction such that the actuating device (1) performs a feed motion within the predetermined slide; wherein the linear slide module (3) comprises a ball screw (43), and a feed slide (44); the feed slide (44) slides along the ball screw (43), thereby causing the actuating device (1) to slide to control feeding movement of the continuum manipulator (2); through the movement of the actuating device (1), expansion and contraction of the steel cable are controlled, and a force is transmitted to the continuum manipulator (2) so as to control the continuum manipulator (2) to bend; wherein
    each segment comprises a plurality of continuum manipulator modules which are sequential connected and structurally identical;
    each continuum manipulator module of the plurality continuum manipulator modules comprises a metal disc (11); an upper surface (45) and a lower surface (46) of the metal disc (11) are both symmetrically provided with blind holes (16); the blind holes (16) are inserted with compliant rods (8) to connect two metal discs (11) adjacent to each other, and the blind holes (16) on the upper surface (45) and the blind holes (16) on the lower surface (46) are staggered, and connecting line between the two symmetrically disposed blind holes (16) on the upper surface (45) is perpendicular to the connecting line between the two symmetrically disposed blind holes (16) on the lower surface (46); the compliant rods (8) are inserted into the blind holes (16) to fix the two adjacent metal discs (11), and four cylindrical side faces of the metal disc (11) corresponding to the blind holes (16) are provided with threaded holes (17) into which the set screws (12) are screwed to fix the compliant rods (8); and
    the blind holes (16) are in a staggered layout, two pairs of adjacent compliant rods (8) on the upper surface (45) and the lower surface (46) of the metal disc (11) are staggered to form a staggered twin-pivot structure such that the planes in which the bending directions of the upper and lower adjacent compliant rods (8) lie are staggered with each other.

2. The robot of claim 1, wherein each of an upper surface (45) and a lower surface (46) of the metal disc (11) is provided with a chamfered groove face (19), wherein each chamfered groove face (19) is provided with a set of cable through holes (14), the number of the through holes decreasing from outside to inside, the driving cables (29) passing through the cable through holes (14) manipulating the manipulator to perform a bending movement.

3. The robot of claim 2, wherein the upper surface (45) of the metal disc (11) is provided with an earring (15); and the earrings (15) are symmetrically arranged on the upper surface (45) of the metal disc (11) (denoted as the metal disc A) at the relative positions of the circular arc chamfered grooves (13), the outer sides of the earrings (15) are symmetrically provided with micro-bearings (9), and the symmetrically provided earrings (15) and micro-bearings (9) are connected by a pin (10) so that the micro-bearings (9) fall into the arc-shaped chamfered grooves; one more metal disc (11) (denoted as the metal disc B) is arranged on the metal disc A provided with the micro-bearing, so that a section of bendable segment is constructed, at this time, the outer ring of the micro-bearing is in contact with the circular arc chamfered groove (13) of the lower surface (46) of the metal disc B, and when the segment is bent, the outer ring of the micro-bearing is relatively stationary with the circular arc chamfered groove (13) of the upper surface (45) of the metal disc A and with the circular arc chamfered groove (13) of the lower surface (46) of the metal disc B (a rotating shaft is the inner ring of the bearing), thereby reducing the friction between the metal discs (11) of the manipulator.

4. The robot of claim 3, wherein the lower surface (46) of the metal metal disc (11) is provided with a shoulder (18) for gripping the micro-bearings (9), the shoulders (18) are symmetrically provided on the circular arc chamfered grooves (13) on the lower surface (46) of the metal disc (11), and the shoulders (18) and the earrings (15) on the upper surface (45) of the metal disc (11) are staggered, so that the micro-bearings (9) can be firmly fixed to the metal disc (11) via the shoulders (18).

5. The robot of claim 4, wherein a side of the metal disc (11) is uniformly provided with grooves (20), and wherein the mass of the metal disc (11) is reduced and the bending flexibility of the manipulator is improved by providing four grooves (20) uniformly on the cylindrical side of the metal disc (11).

6. The robot of claim 3, wherein the outside of the earring (15) is symmetrically provided with bosses (22); wherein instead of using the pin (10), the bosses (22) may be symmetrically provided on the earrings (15) to connect the micro-bearings (9); by using the bosses (22) instead of the pin (10), the mass of the manipulator may be further reduced to some extent and the overall structure of the metal disc (11) may be more integrated.

* * * * *